United States Patent [19]

Campbell et al.

[11] 4,388,533
[45] Jun. 14, 1983

[54] POWER GENERATING SYSTEM

[76] Inventors: Larry K. Campbell, 3445 Almand Dr., Apt. B-1; William D. Farrier, 3445 Almand Dr., Apt. D-2, both of College Park, Ga. 30337

[21] Appl. No.: 246,118

[22] Filed: Mar. 20, 1981

[51] Int. Cl.³ .......................... F03G 7/02; H02P 9/04
[52] U.S. Cl. ................................... 290/1 R; 60/641.8; 60/641.12; 290/44; 290/55
[58] Field of Search .................. 290/1, 43, 44, 54, 55; 60/641.8, 641.12, 641.13, 641.14, 641.15

[56] References Cited

U.S. PATENT DOCUMENTS

| 751,209 | 2/1904 | Schwarze | 415/56 |
|---|---|---|---|
| 1,386,781 | 8/1921 | Harvey | 60/641.15 |
| 2,072,752 | 3/1937 | Hirstius | 415/4 A |
| 3,936,652 | 2/1976 | Levine | 290/55 |
| 3,979,597 | 9/1976 | Drucker | 290/1 R |
| 4,229,941 | 10/1980 | Hope | 60/641.15 |

FOREIGN PATENT DOCUMENTS 1072752  3/1980  Canada ........................... 60/641.15

Primary Examiner—J. V. Truhe
Assistant Examiner—Shelley Wade
Attorney, Agent, or Firm—B. J. Powell

[57] ABSTRACT

A power generating system for supplying electrical power to an external electrical power demand load including a vertically oriented centerbody adapted to adsorb radiant solar energy; an annular enclosure around the centerbody defining a vertically extending air passage between the centerbody and the enclosure capable of transmitting radiant solar energy therethrough toward the centerbody; mirror means for directing solar radiant energy through the enclosure onto the centerbody to heat it so that the air in the air passage is heated to induce an airflow through the passage; a rotor rotatably mounted at the lower end of the air passage with a plurality of vanes operatively associated with the air passing into the lower end of the air passage to cause the rotor to rotate; electrical power generating means operatively connected to the rotor so that rotation of the rotor causes the generating means to generate electrical power for the external electrical power demand load; and fuel synthesis means selectively connected to the output of the power generating means to generate and store hydrogen when the output of the power generating means exceeds the external power demand load and to supply hydrogen from storage for burning in the air passage to heat the air therein when the output from the power generating means is less than the external power demand load.

8 Claims, 11 Drawing Figures

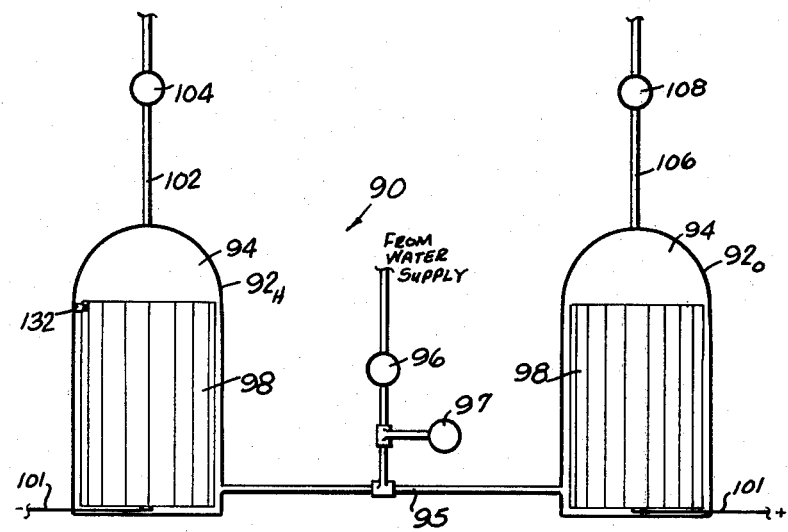
FIG 5
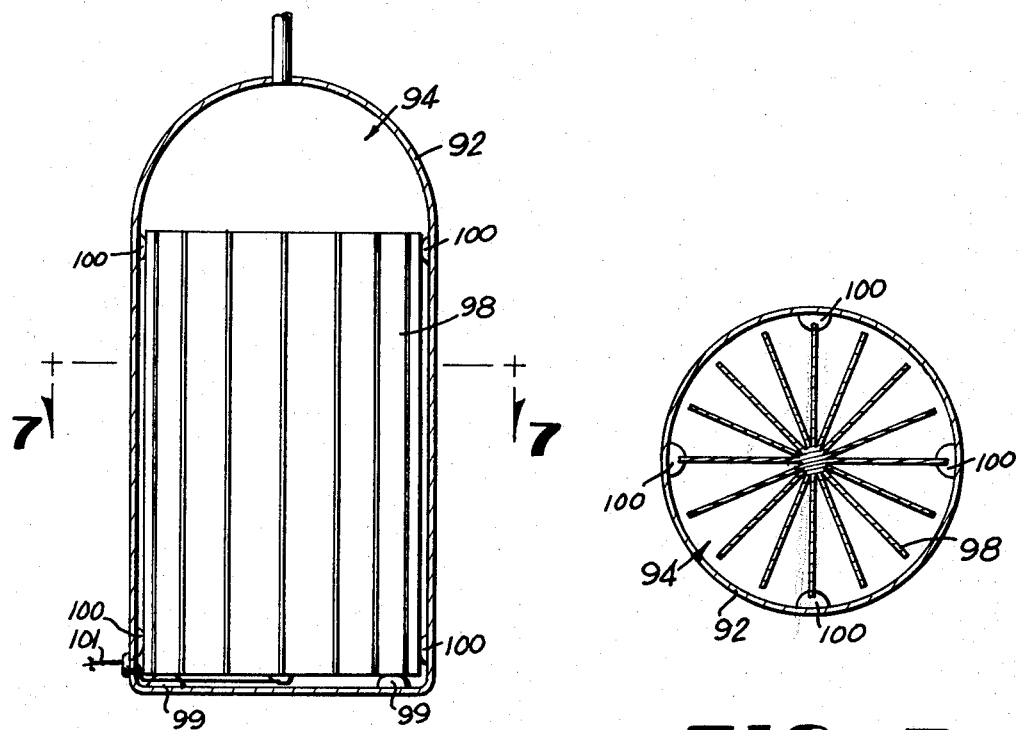
FIG 6
FIG 7

POWER GENERATING SYSTEM

BACKGROUND OF THE INVENTION

This invention relates generally to solar powered electric power generator systems and more particularly to such systems which use solar heated air as the motive source to power such system.

Solar powered electric power generator systems have been proposed which use solar heated air to drive the electric power generator of the system. One of the difficulties inherent in such systems is that the electric power output capability varies as the amount of sunlight varies. This variance typically does not match the electric power demand variances on such systems. As a result, various storage subsystems were necessary to store excess electrical power that can be generated during periods of sunlight where the electrical generating capacity of the system exceeded the electrical demand load on the system so that the stored electrical energy could be used during periods where the electrical generating capacity of the system was less than the electrical demand load on the system. Because electrical energy is difficult to store economically, economically feasible storage subsystems for this purpose have not been developed. This has resulted in such generator systems not being able to reliably supply the total electrical power demand without additional backup systems to supply electrical power when the solar powered system was unable to meet the demand load. The overall costs of such solar powered generator systems in combination with the backup systems have been economically unfeasible to use.

Another problem with such prior art systems is that they have generally been unable to generate a sufficient amount of solar heated air to drive the electric power generator. This was due partly to the inability of such systems to collect a sufficient amount of sunlight when it was available to heat the air and also partly due to the inability to sufficiently use the air that was solar heated to drive the electrical power generator while at the same time keeping the cost of such systems economically feasible.

SUMMARY OF THE INVENTION

These and other problems and disadvantages associated with the prior art are overcome by the invention disclosed herein by providing an electric power generator system which has the capability of using solar energy to heat air and drive an electric power generator and which stores excess energy in the form of a fuel rather than electrical energy. The stored fuel is used to heat the air and drive the electric power generator when the amount of solar energy available is not sufficient for the system to meet the external electrical demand load on the system. Further, the system has the ability to collect a sufficient amount of sunlight when it is available to operate the system and has the capability of tracking the sun so that the maximum amount of solar energy is collected and concentrated to heat the air and drive the electric power generator. The system is designed for the air to pass through the rotor driving the electric power generator twice to maximize the use of the air to drive the electric power generator.

The system includes generally a column unit defining a generally vertically extending air passage therethrough with a centerbody therein capable of absorbing solar energy to heat the centerbody. The centerbody heats the air within the air passage and induces an air flow vertically through the column unit. A movable mirror unit is provided which can move around the column unit to reflect sunlight onto the centerbody in the column unit to heat it. The mirror unit has a tracking mirror assembly positioned on one side of the column unit and a concentrator mirror assembly positioned on the diametrically opposite side of the column unit so that the tracking mirror assembly reflects the sunlight horizontally across to the concentrator mirror unit which in turn reflects and concentrates the sunlight onto the centerbody in the column unit. A rotor is operatively associated with the bottom of air passage in the column unit so that the air flow induced by heating the air in the air passage in the column unit forces air through the rotor as it moves into the air passage in the column unit to rotate it. The rotor has two sets of vanes in it and the air passes through both sets of vanes in the rotor to maximize the driving force on the rotor by the incoming air into the air passage through the column unit. The rotor rotates magnets past coils to generate an electrical power output as the rotor is rotated. A fuel synthesis unit is provided which is connected to the output of the electric power generator to generate hydrogen with that portion of power from the electric power generator in excess of the external demand load and stores this hydrogen. A burner unit is provided in the air passage through the column unit and the fuel synthesis unit selectively provides hydrogen from storage to the burner assembly for burning in the air passage to heat the air in the air passage when the air is not sufficiently heated by solar energy to drive the electric power generator so as to meet the external power demand load.

These and other features and advantages of the invention will become more clearly understood upon consideration of the following description and accompanying drawings wherein like characters of reference designate corresponding parts throughout the several views and in which:

BRIEF DESCRIPTION OF THE DRAWINGS

FIG. 5 is a view showing the gas generator of the fuel synthesis unit;

FIG. 6 is an enlarged view of one of the housings of the gas generator;

FIG. 7 is a cross-sectional view taken generally along line 7—7 in FIG. 6;

These figures and the following detailed descriptions disclose specific embodiments of the invention; however, it is to be understood that the inventive concept is not limited thereto since it may be embodied in other forms.

DETAILED DESCRIPTION OF ILLUSTRATIVE EMBODIMENTS

Figure 1:
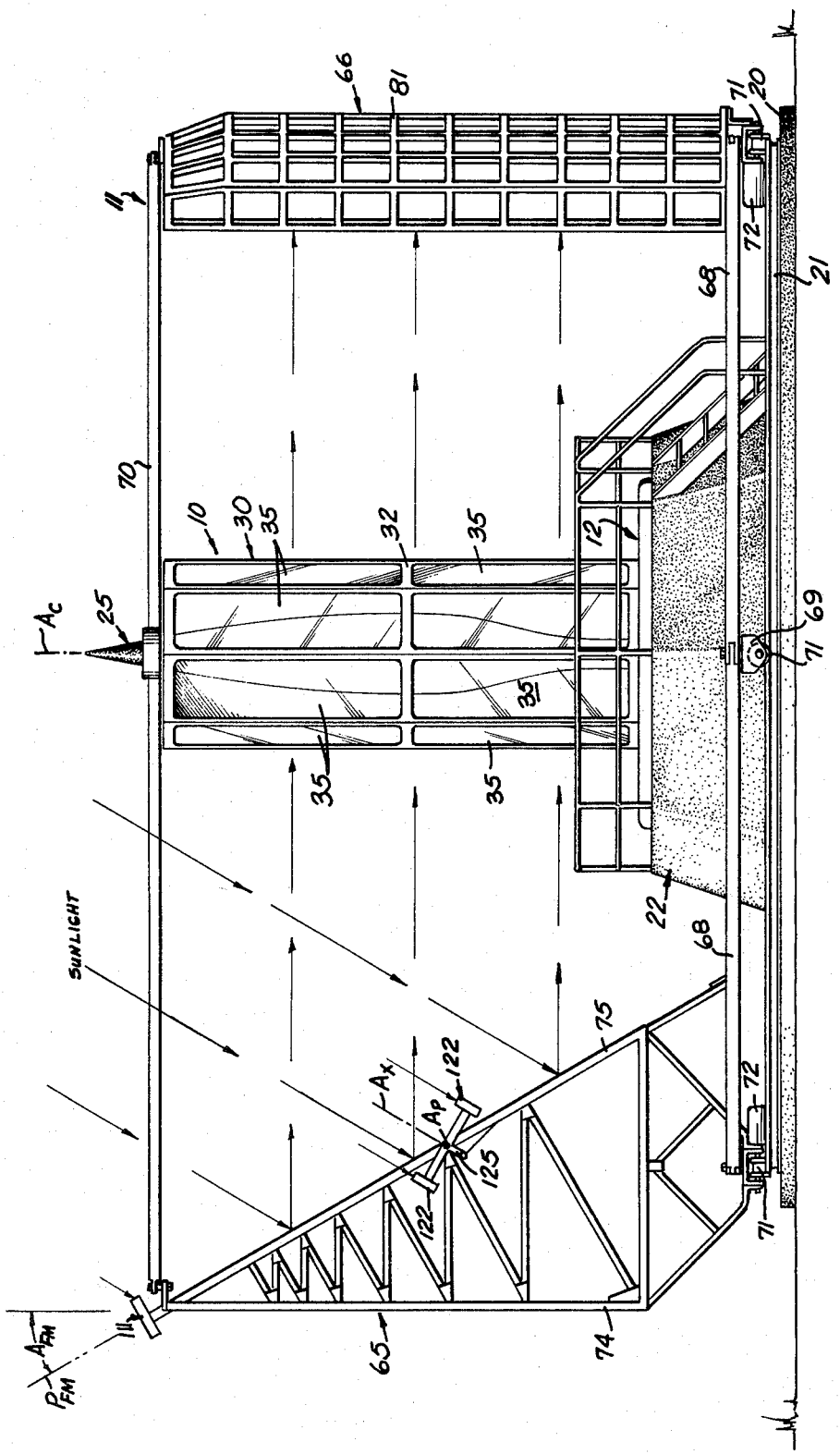
FIG. 1 is a side elevational view of the system embodying the invention.
Figure 2:
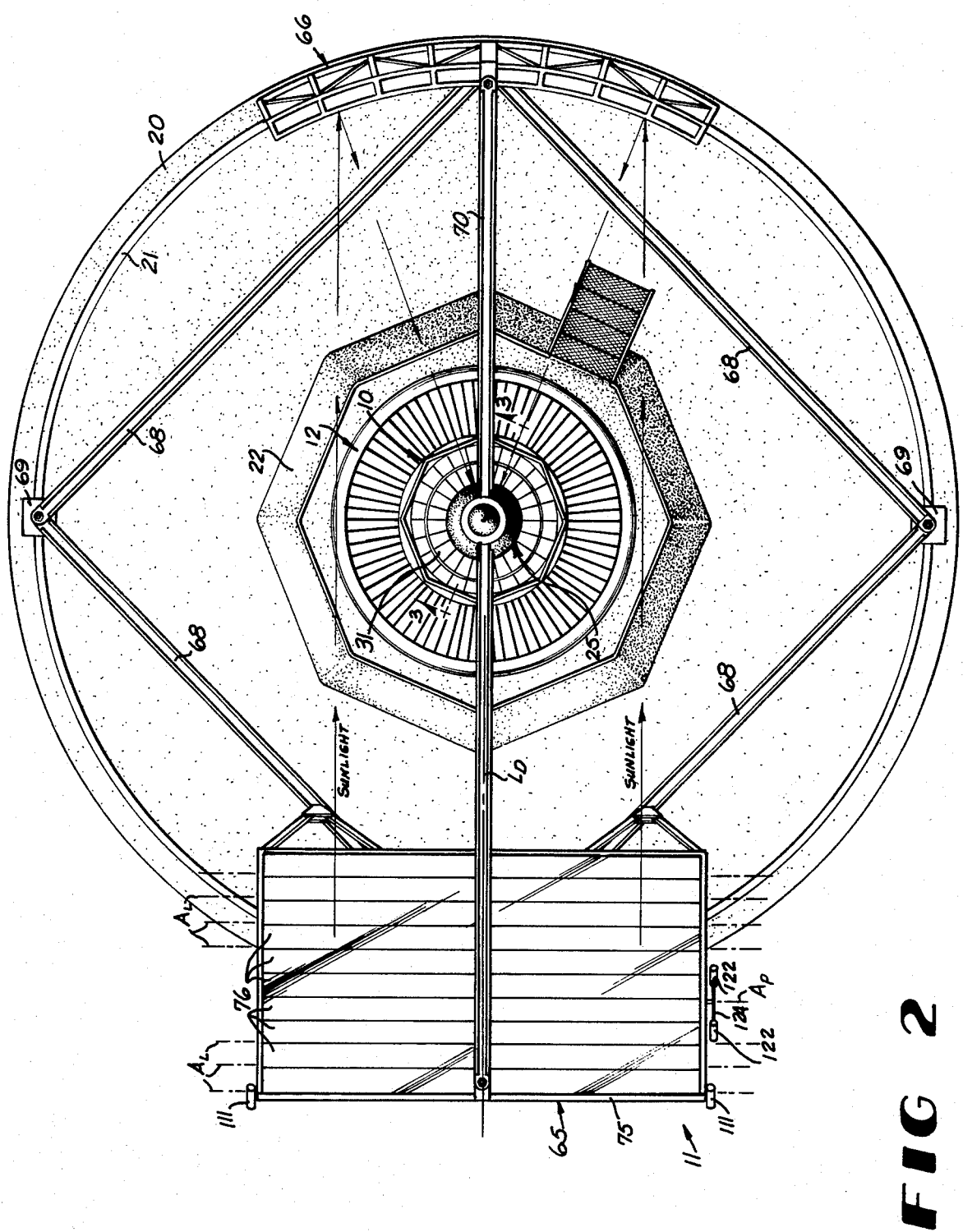
FIG. 2 is a top plan view of the system.
Figure 3:
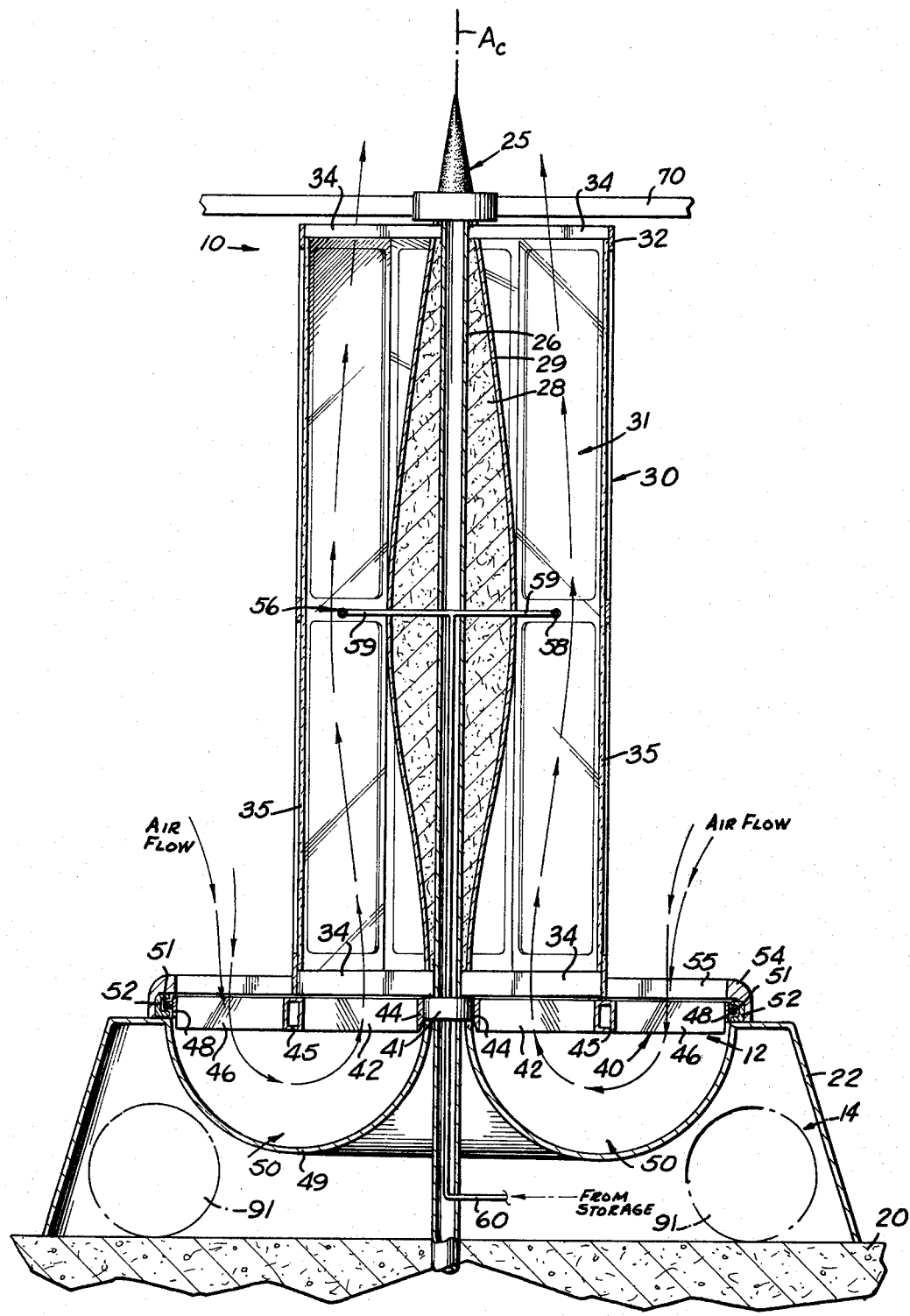
FIG. 3 is a cross-sectional view of the column unit of the system taken generally along line 3—3 in FIG. 2.

Referring to FIGS. 1-3, it will be seen that the system of the invention includes generally a column unit 10 in which air is heated to induce a flow of air therethrough, a mirror unit 11 for directing solar energy onto the column unit 10 to heat the air therein and an electrical power generator unit 12 operatively associated with the column unit 9 so that the air flowing through the column unit 10 will drive the electric power generator unit 12. As best seen in FIGS. 4–7, the system of the invention also includes a fuel synthesis unit 14 operatively connected to the generator unit 12 to generate and store fuel while the generator unit 12 is being powered by the solar energy directed onto the column unit 10. The fuel synthesis unit 14 is designed to be electrically operated and uses that portion of the electrical power output from the generator unit 12 which exceeds the external power demand load on the generator unit 12 to generate the fuel for storage.

When the amount of solar energy directed onto the column unit 10 drops to a level where the solar heated air flow through the column 10 is insufficient to drive the generator unit 12 so that the electrical power output from the generator unit 12 meets the external power demand load thereon, the fuel synthesized in the fuel synthesis unit 14 is supplied to the column unit 10 where it is burned in the column unit 10 to heat the air therein and induce sufficient air flow through the column unit 10 to drive the generator unit 12 at a level such that the electrical power output thereof meets the external power demand load on the generator unit 12. Thus, rather than trying to store the electrical energy, the system of the invention generates a fuel which can be easily stored and then resupplied to the column unit 10 as necessary to maintain the electrical power output from the generator unit 12 at a level to satisfy the external electrical power demand load.

The components of the system are mounted on a circular foundation 20 best seen in FIGS. 1 and 2 which is provided with an annular support rail 21 around the periphery thereof on which the mirror unit 11 is movably mounted. An upstanding base 22 is located on foundation 20 centrally of the support rail 21. The base 22 mounts the column unit 10 and generator unit 12 thereon and the fuel synthesis unit 14 therein. The column unit 10 thus projects upwardly from the base 22 along its vertical axis $A_C$ so that the mirror unit 11 can direct the sunlight thereonto to heat the air therein.

The column unit 10 best seen in FIG. 3 includes a centerbody assembly 25 mounted on the foundation 20 and projecting upwardly through the base 22 along the axis $A_C$. The centerbody assembly 25 includes a centerpost 26 secured at its lower end in the foundation 20 and projecting upwardly therefrom about the axis $A_C$. The centerpost 26 is covered by a heat absorbing filler material 28 which in turn is enclosed within an external shell 29 forming the external shape of the centerbody assembly 25. The shell 29 has a circular transverse cross-sectional shape increasing in diameter from the upper and lower ends thereof toward its middle. The external shell 28 is provided with a heat absorbing exterior surface, ususally painted black so that when sunlight is impinged thereonto, the solar energy will be absorbed in the centerbody 25 to heat same.

The column unit 10 also includes an annular enclosure assembly 30 which is positioned around the centerbody assembly 25 so that the enclosure assembly 30 is concentrically located with respect to the centerbody assembly 25 and extends along the length thereof to define an air passage 31 between the enclosure assembly 30 and the centerbody assembly 25. The air passage 31 is open to the atmosphere at its upper end and also open to the atmosphere at its lower end through the power generating unit 12 as will become more apparent.

The enclosure assembly 30 includes an annular frame 32 supported on the centerpost 26 through struts 34 extending between the centerpost 26 and the frame 32 across the air passage 31 at the upper and lower ends thereof. The struts 34 are circumferentially spaced around the centerpost 26 so that air is free to flow into the lower end of the air passage 31 and to flow out of the upper end of the air passage 31. The frame 32 provides openings therethrough covered by solar energy transmitting panels 35 so that the solar energy directed onto the panels 35 toward the centerbody assembly 25 will be transmitted therethrough onto the centerbody assembly 25. The panels 35 may be made out of a number of different materials such as glass or the like. Preferably, the panels 35 should be treated with an appropriate coating to permit solar energy to pass therethrough into the air passage 31 but substantially prevent retransmission of energy re-radiated from the centerbody assembly 25 as it is heated. A number of different commercially available coatings are available for this purpose.

It will be noted that the varying diameter of the shell 29 on the centerbody assembly 25 causes the air passage 31 to be smaller in cross-sectional area at the mid-portion of the centerbody assembly 25 than at the opposite ends thereof to generate a venturi effect as the air flows through the air passage 31. The mirror unit 11 directs sunlight through the panels 35 of the column unit 10 across air passage 31 and onto the surface of centerbody assembly 25 to heat the centerbody assembly 25. As the centerbody assembly 25 is heated, the centerbody assembly 25 in turn heats the air in the air passage 31. As the air in the air passage 31 is heated, it rises by natural convection to pass out of the upper end of the air passage 31. As will become more apparent, fresh air is drawn into the lower end of the air passage 31 to be heated by the centerbody assembly 25 so that an upwardly directed air flow is induced through the air passage 31.

The electrical power generator unit 12 includes a rotor 40 rotatably mounted on the centerpost 26 of the centerbody assembly 25 by bearing 41 just below the bottom of the enclosure assembly 30 so that the air being drawn into the lower end of the air passage 31 will pass therethrough as will become more apparent. The rotor 40 includes an inner set of vanes 42 which extend radially outwardly from the central hub 44 mounting the rotor 40 on the bearing 41 to an intermediate separator ring 45 connected to the vanes 42 at their outer ends. The separator ring 45 is arranged concentrically of the axis $A_C$. An outer set of vanes 46 project outwardly from the separator ring 45 and are circumferentially spaced around the separator ring 45. The outer projecting ends of the vanes 46 are mounted on an outer support ring 48 which is also arranged concentrically of the axis $A_C$. It will be seen that the inner vanes 42 underline the lower end of the air passage 31 while the outer vanes 48 project outwardly past the bottom of the enclosure assembly 30. The inner vanes 42 are angled in one direction while the outer vanes 46 are angled in the opposite direction so that, as the air is drawn into the lower end of the air passage 31, it will first pass through the outer vanes 46 as it is moving downwardly to move the rotor 40 in a given rotational direction and then will flow upwardly through the inner vanes 42 as it passes into the bottom of the air passage 31 to further drive the rotor in the same rotational direction. To force the air to move through both the outer and inner sets of vanes 42 and 46, the base 22 is provided with an annular duct 49 positioned under the rotor 40 to define an inlet passage 50 with the outer vanes 46 located over the inlet end of the inlet passage 50 and the inner vanes 42 located over the discharge end of the inlet pasage 50.

The outer support ring 48 on the rotor 40 is provided with magnets 51 thereon and a plurality of coils 52 are fixedly positioned about the periphery of the rotor 40 so that the coils 52 are operatively associated with the magnets 51 to cause an electrical output to be generated in the coils 52 as the rotor 40 rotates the magnets 51 thereby. It is understood that different arrangements may be provided to cause the rotating motor 40 to generate an electrical power output. The coils 52 are housed in an annular support 54 mounted on the base 22 and extending therearound concentrically of the axis $A_C$ around the rotor 40. The annular support 54 projects above the rotor 40 and a plurality of stator blades 55 extend between the enclosure assembly 30 and the annular support 54 to direct the air into the inlet end of the air inlet passage 50 through the outer vanes 46. Thus, as the air in the air passage 31 through the column unit 10 is heated and flows upwardly, fresh air is drawn in through the stator blades 55 through the outer vanes 46 on the rotor 40, then through the inlet air passage 50, and finally through the inner vanes 42 on the rotor 40 to pass into the lower end of the air passage 31. This causes the air to rotate the rotor 40 to cause an electrical output to be generated from the coils 52.

As seen in FIG. 3, the centerpost 26 is hollow and a burner assembly 56 is carried therein. The burner assembly 56 includes a burner ring 58 in passage 31 and extending around the centerbody assembly 25 at a position midpoint of the column unit 10. The burner ring 58 is supported on fuel supply pipes 59 which extend radially outwardly from the centerpost 26 across the air passage 31 to the burner ring 58. A vertically extending inlet pipe 60 is connected to the supply pipes 59 and extends downwardly through the centerpost 26 below the generator unit 12 to exit the centerpost 26 within the base 22. The inlet pipe 60 is connected to the fuel synthesis unit 14 as will become more apparent. It will thus be seen that fuel supplied to the burner ring 58 through the pipes 59 and 60 will be discharged to the air passage 31. When the fuel is ignited using conventional means such as an igniter plug, the fuel will burn to heat the air within the air passage 31 and cause the heated air to rise out of the top of the passage 31 thereby drawing air into the bottom of the passage 31 through the rotor vanes 42 and 46 to rotate the rotor. Thus, it will be seen that the heat to drive the air through the air passage 31 can be supplied either by solar energy or by the fuel.

The mirror unit 11 includes a tracking mirror assembly 65 mounted on the support rail 21 on one side of the column unit 10 and a concentrator mirror assembly 66 mounted on the support rail 21 on the diametrically opposite side of the column unit 10. The tracking mirror assembly 65 serves to reflect the incoming sunlight onto the concentrator mirror assembly 66 which, in turn, concentrates the thusly reflected sunlight onto the centerbody assembly 25 within the enclosure assembly 30 of the column unit 10. The tracking mirror assembly 65 and concentrator mirror assembly 66 are interconnected by lower links 68 provided with idlers 69 that also ride on the support rail 21. The upper ends of the tracking mirror assembly 65 and concentrator assembly 66 are connected by an upper link 70 which is rotatably journalled around the centerpost 26 in the centerbody assembly 25 above the upper end of the enclosure assembly 30 so as not to be in interference therewith. Thus, it will be seen that the lower links 68 and upper link 70 hold the mirror assemblies 65 and 66 so that the assemblies 65 and 66 can be moved on a circular path around the column unit 10 on the support rail 21.

The tracking mirror assembly 65, the concentrator mirror assembly 66 and the idlers 69 are provided with support wheels 71 adapted to ride on the support track 21 so that the mirror unit 11 is positionable around the column unit 10. The support wheels 71 are provided with drive motors 72 for rotating the support wheels 71 and moving the mirror unit 11 circumferentially around the column unit 10.

Figure 8:
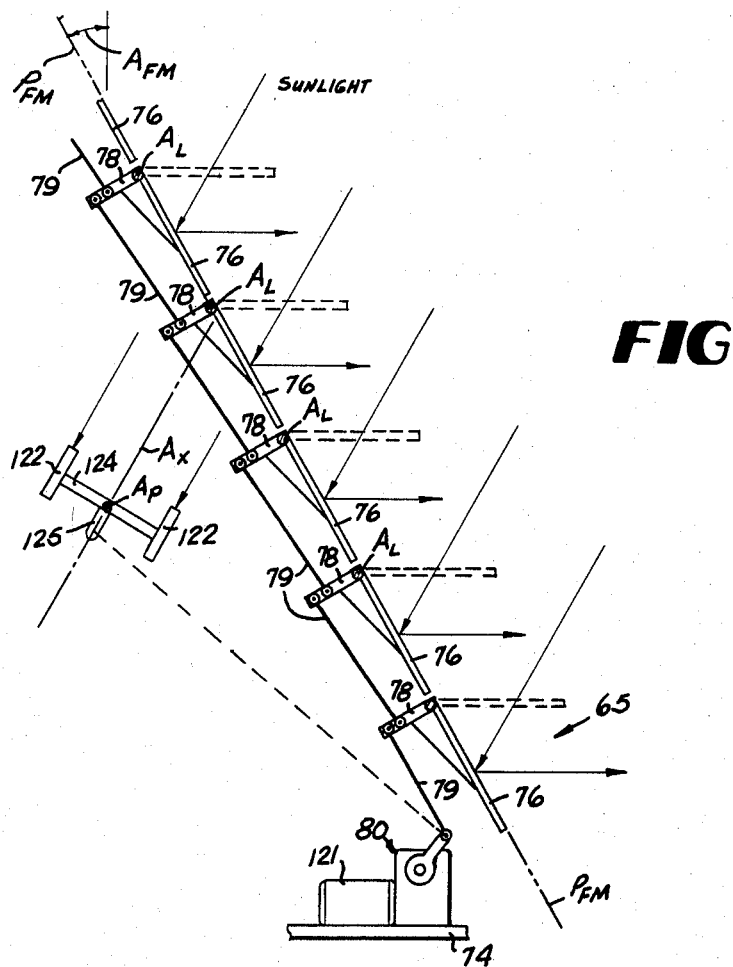
FIG. 8 is a view showing the pivoted mirrors in the tracking mirror assembly.

The tracking mirror assembly 65 includes an open support frame 74 supported between the support wheels 71 and the lower links 68 so that the support frame 74 extends upwardly therefrom. The upper end of the support frame 74 is connected to one end of the upper link 70. The support frame 74 includes an inclined mirror frame 75, tilted at an angle $A_{FM}$ as seen in FIG. 1 with respect to the vertical and facing the column unit 10. As best seen in FIGS. 2 and 8, a plurality of flat mirrors 76 are pivotally mounted in the mirror frame 75 in a side-by-side relationship. The mirrors 76 are each pivoted about a horizontally extending axis $A_L$ oriented normal to a diametrically extending line $L_D$ across foundation 20 through the axis $A_C$ of the column unit 10 as seen in FIG. 2. The axes $A_L$ are parallel to each other and located in the mirror frame 75 at spaced apart positions so that all of the mirrors 76 can be pivoted to a common mirror plane $P_{FM}$ seen in FIG. 8 tilted at the angle $A_{FM}$ with respect to the vertical. The angle $A_{FM}$ is selected so that, when the mirrors 76 are located so that their reflective surfaces lie in the plane $P_{FM}$, and the mirror assembly 65 moved until it is facing the sun so that the incoming sunlight will be reflected horizontally to the concentrator mirror assembly 66 when the sun is at its average angle of inclination with respect to the location at which the system is located. Because the angle of inclination varies during the year, each of the flat mirrors 76 can be pivoted about its horizontal axis $A_L$ to adjust for this variance. Each of the flat mirrors 76 is provided with a pivot link 78 affixed to the mirror 76 at its pivot so that the mirror can be pivoted through the pivot link 78. Drive links 79 connect each of the pivot links 78 with an eccentric drive 80 so that, as the eccentric drive 80 simultaneously drives the drive links 79, all of the flat mirrors 76 will be simultaneously pivoted about their pivot axes $A_L$. This allows the flat mirrors 75 to be pivoted until the sunlight reflected thereby is directed horizontally to the concentrator mirror assembly 66. Also, in high winds, the eccentric drive is used to pivot the mirrors up to a horizontal position seen by dashed lines in FIG. 8 so that the wind resistance mirrors of 76 is reduced to an acceptable level to prevent damage to the mirror assembly 65.

Figure 9:
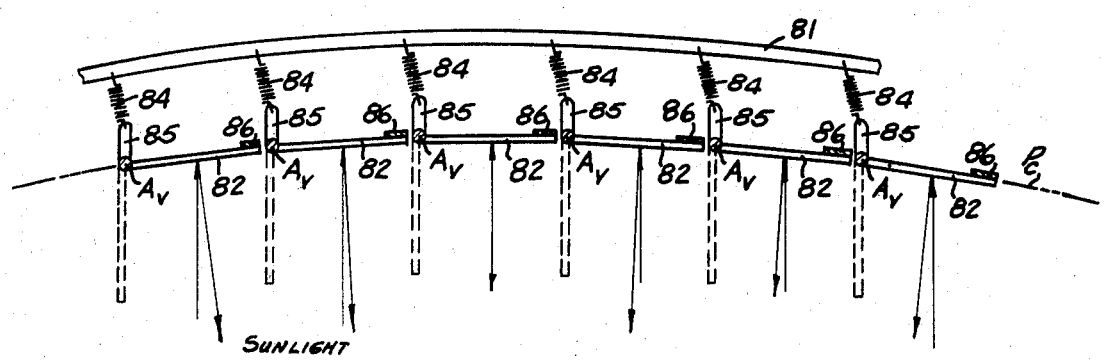
FIG. 9 is a view illustrating the mirrors in the concentrator mirror assembly.

The concentrator mirror assembly 66 seen in FIGS. 1, 2 and 9 includes an open support frame 81 supported between wheels 71 and lower links 68 so that the frame 81 extends upwardly therefrom. The support frame 81 pivotally mounts a plurality of vertically extending flat mirrors 82 therein in a side-by-side relationship so that the mirrors 82 are individually pivoted about parallel vertical axes $A_V$ spaced apart along a curvilinear path $P_C$. Each of the mirrors 82 has a concentrating position as shown by solid lines in FIG. 9 so that the sunlight reflected thereonto by the tracking mirrors 76 will be reflected thereby with all of the mirrors 82 focusing such reflected sunlight onto the centerbody assembly 25. Each of the mirrors 82 is held in the concentrating position against stop 86 by a spring 84 connected to a drive link 85 on mirror 82. In high wind conditions, however, the spring 84 allows the mirror 82 to pivot away from the concentrating position until the mirror 82 is aligned with the wind as shown by dashed lines in FIG. 9 so that the wind resistance of mirrors 82 is reduced to an acceptable level to prevent damage to the mirror assembly 66.

Figure 4:
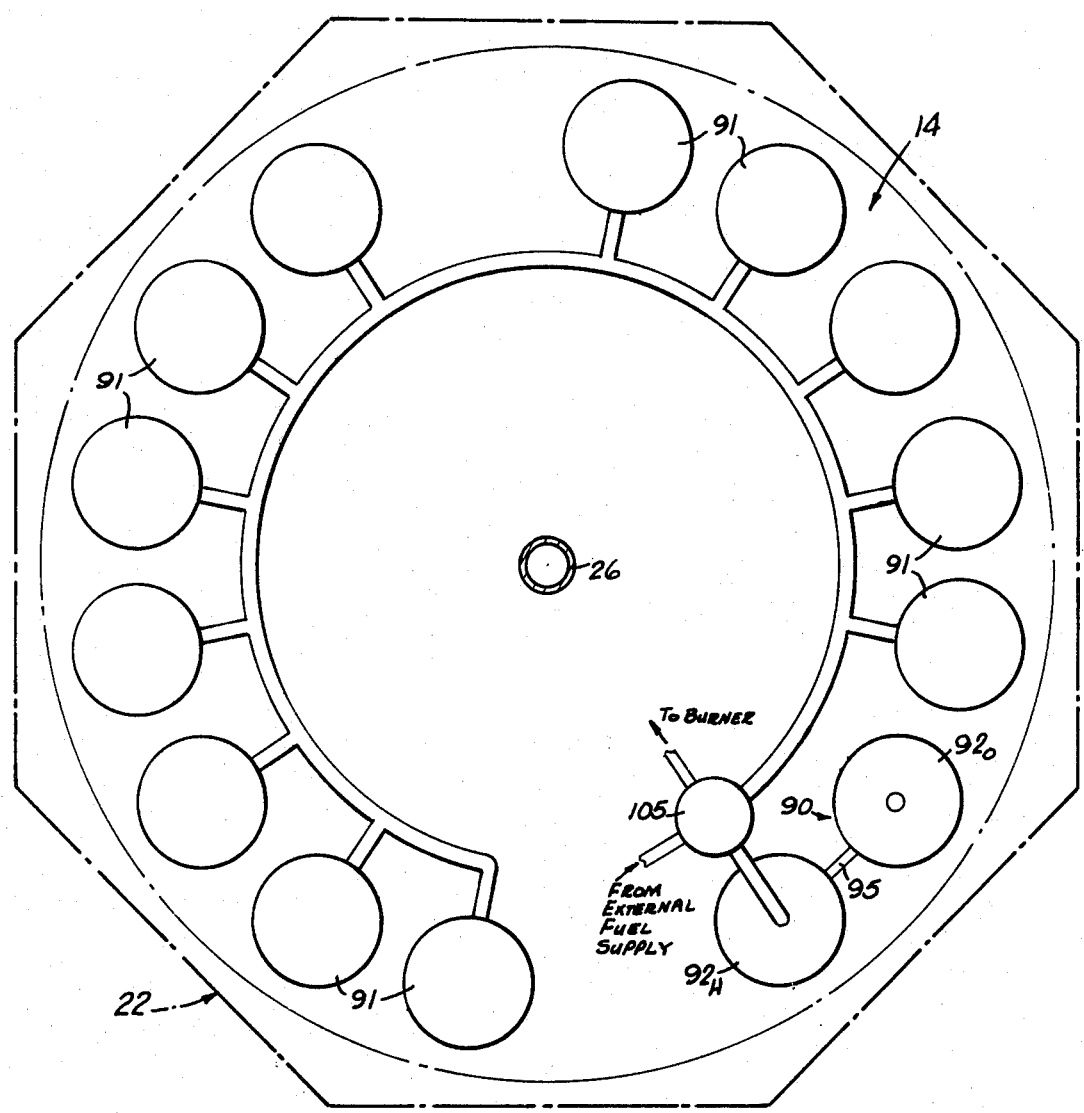
FIG. 4 is a view illustrating the fuel synthesis unit of the system.

The fuel synthesis unit 14 is best seen in FIGS. 4-7. The fuel synthesis unit includes a fuel generator 90 whose output is connected to a plurality of fuel storage tanks 91 as best seen in FIG. 4. The fuel generator 90 and fuel storage tanks 91 are housed within the base 22 indicated by phantom lines in FIG. 4.

The fuel generator 90 is an electrolysis unit including a pair of closed housings 92, each defining a closed chamber 94 therein with the lower portion of the chambers 94 being interconnected by a transfer pipe 95. The transfer pipe 95 is connected to a water source through an inlet valve 96 so that the chambers 94 can be filled with water from the water source through the inlet valve 96. An electrolyte supply 97 may also be provided to supply an appropriate electrolyte to chambers 94 through pipe 95 to assist in the electrolysis process.

Each of the chambers 94 mounts a vane electrode 98 therein on insulating supports 99 and insulating standoffs 100 so that the vane electrode 98 is spaced from the walls of the housing 92. Each vane electrode 98 is connected to a power lead 101 so that power can be supplied to the vane electrode 98. As best seen in FIG. 5, one of the power leads 101 is connected to the positive side of the electrical power output from the generator unit 12 while the power lead 101 of the other vane electrode 98 is connected to the negative power output of the generator unit 12. To operate the fuel generator 90, a DC voltage is required. Thus, if electrical power generating unit 12 produces a DC voltage output, it can be connected directly to the power leads 101. On the other hand, if the electric power generator unit 12 generates an AC voltage output, then such output would be rectified before connecting to the power leads 101.

With the power leads 101 connected to a DC voltage source and the chambers 94 filled with water, the water in the chambers 94 will be electrolyzed with oxygen being formed in the top of that housing 92 whose vane electrode is connected to the positive side of the power source while hydrogen will be generated in that housing 92 connected to the negative side of the power source. That housing 92 where the oxygen is generated is labelled $92_O$ and that tank housing where the hydrogen is generated has been labelled $92_H$ in FIG. 5 for clarity.

An outlet pipe 102 communicating with the top of the housing $92_H$ allows the hydrogen generated therein to be drawn off with pump 104 and supplied to the storage tanks 91 through a distribution valve assembly 105 seen in FIG. 4. An outlet pipe 106 is connected to the top of the housing $92_O$ to allow the oxygen to be drawn off with the pump 108 for collection. The hydrogen generated in the fuel generator 90 is stored in tanks 91 for subsequent reuse during periods of low sunlight while the oxygen generated by the fuel generator 90 can be sold as a by-product.

The distribution valve assembly 105 is also connected to the inlet pipe 60 of the burner assembly 56 so that when fuel is needed to be burned in the column 10, the valve assembly 105 will supply the hydrogen stored in tanks 91 through the inlet pipe 60 and the fuel supply pipes 59 to the burner ring 59 for ignition and burning in the air passage 31 in column unit 10. In instances where fuel is needed to be supplied to burner assembly 56 but insufficient hydrogen is available from the storage tanks 91, the distribution valve assembly 105 may be connected to an external fuel supply and operated to supply the fuel from the external fuel supply to the burner assembly 59 for burning in the air passage 31 through the column unit 10.

Figure 10:
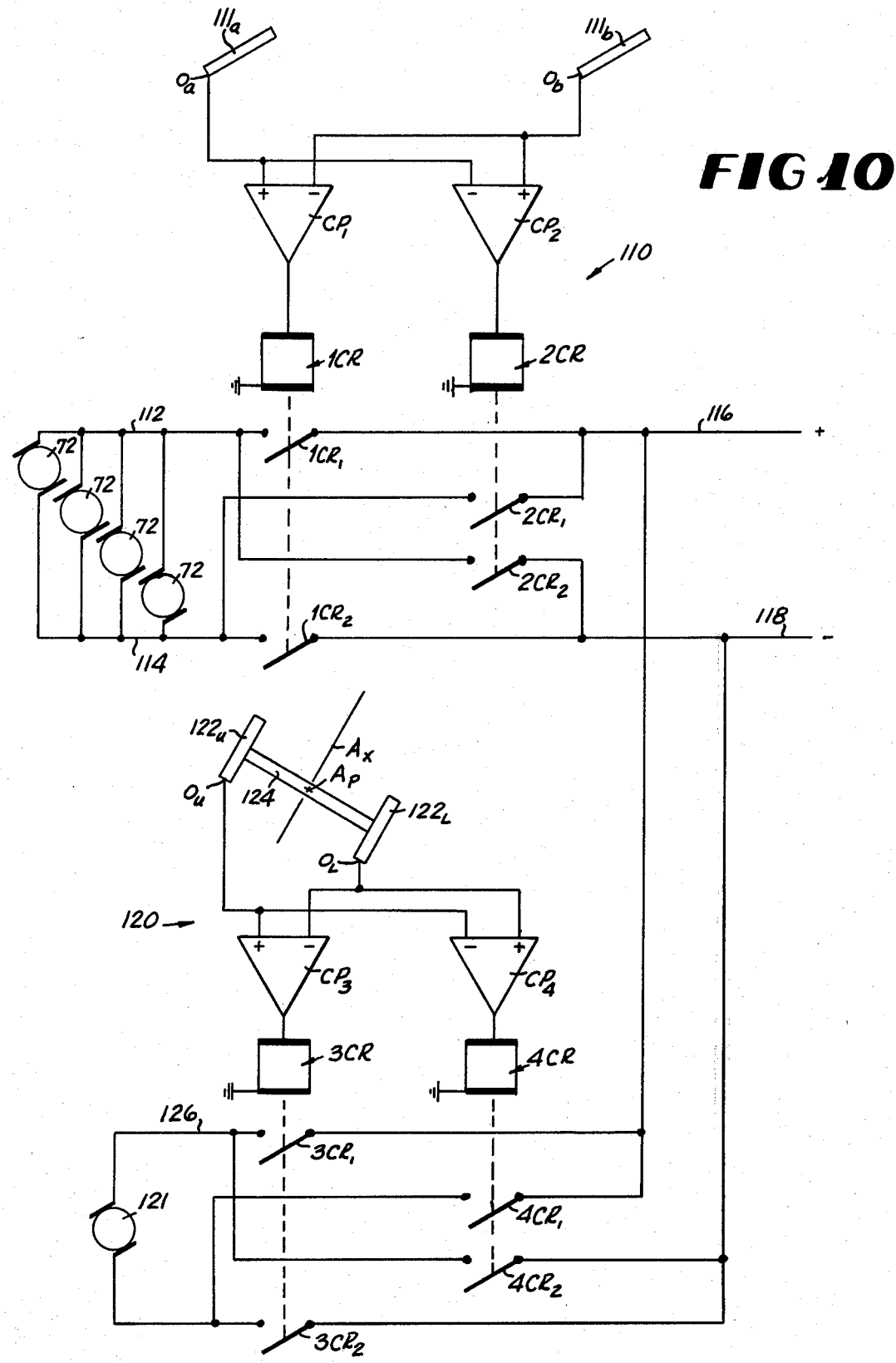
FIG. 10 is an electrical schematic illustrating the sun tracking control circuit of the system.

To control the position of the mirror unit 11, a horizontal sun tracking control circuit 110 as seen in FIG. 10 is used to control the operation of the drive motors 72 to rotate the support wheels 71 and thus rotate the mirror unit 11 about the central axis $A_C$ of the column unit 10. The drive motors 72 are reversible so that they can be rotated in either direction.

The horizontal sun tracking control circuit 110 includes a pair of collimated photoelectric cells 111 mounted at fixed positions on opposite sides of the top of the support frame 74 of the tracking mirror assembly 65 as best seen in FIGS. 1 and 2. The collimated photoelectric cells 111 are aimed generally normal to the plan $P_{FM}$ of the mirrors in the tracking mirror assembly 65 so that when the mirrors 76 in the tracking mirror assembly 65 face the sun, sunlight will be directed into the collimated photoelectric cells 111. When sunlight is directed into the collimated photoelectric cells 111, the output therefrom will vary according to the intensity of the sunlight imposed thereon. Because the photoelectric cells 111 are positioned at spaced apart positions on frame 74 and oriented parallel to each other, it will be seen that, when the tracking mirror assembly 65 is directly facing the sun, the amount of the sunlight received by each of the photoelectric cells 111 will be equal. As the sun moves relative to the tracking mirror assembly 65, however, the sun will shine more directly into one of the photoelectric cells 111 than in the other so that the values of the outputs therefrom differ from each other. This difference in output of the photoelectric cells 111 is used to control the drive motors 72 to reposition the mirror unit 11 so that the mirrors 76 of the tracking mirror assembly 65 are moved to be maintained in a position directly facing the sun as the sun moves with respect to the system.

Referring to FIG. 10, the photoelectric cells have been individually referenced $111_a$ and $111_b$ with their outputs respectively referenced $O_a$ and $O_b$. Outputs $O_a$ and $O_b$ are connected to a comparator $CP_1$ and $CP_2$ so that, when the output $O_a$ is greater than the output $O_b$, comparator $CP_1$ will generate an output; and when output $O_b$ is greater than the output $O_a$, comparator $CP_2$ will generate an output. When the outputs $O_a$ and $O_b$ are equal, neither of the comparators will generate an output. The output of comparator $CP_1$ is connected to the coil of a control relay 1CR while the output of comparator $CP_2$ is connected to the coil of a control relay 2CR. Control relays 1CR and 2CR serve to control the direction of motor rotation so as to selectively move the mirror unit 11 along the support rail 21.

One side of each of the motors 72 is connected to a common wire 112 while the opposite side of each of the motors 72 is connected to the common wire 114. The normally open contacts $1CR_1$ of relay 1CR connect the common wire 112 with a common positive power wire 116 while the normally open contacts $1CR_2$ connect the common wire 114 with a common ground power wire 118. Wires 116 and 118 are connected to a power supply such as a battery which is recharged from the output of generator unit 12. Thus, when relay 1CR is energized, contacts $1CR_1$ connect the common positive power wire 116 with the common wire 112 while contacts $1CR_2$ connect the common ground power wire 118 with the common wire 114 to drive the motors 72 in one rotational direction. The normally open contacts $2CR_1$ of the relay 2CR connect the common ground wire 118 with the common wire 112 while the normally open contacts $2CR_2$ connects the common positive power wire 116 with the common wire 114 to drive the motors 72 in the opposite rotational direction. Thus, when relay 2CR is energized, contacts $2CR_1$ connect the common ground power wire 118 with common wire 112, while contacts $2CR_2$ connects the common positive power wire 116 to common wire 114 to drive motors 72 in the opposite rotational direction. The rotational direction of the motors 72 when relay 1CR is energized is selected to drive the mirror assembly 11 so that the photoelectric cells 111 are moved in a direction where the amount of sunlight received by the photoelectric cell $111_b$ increases and the amount of sunlight received by the photoelectric cell $111_a$ decreases. On the other hand, when the relay 2CR is energized, the motors 72 are rotated to move the mirror unit 11 and the photoelectric cells 111 in a direction where the amount of sunlight received by the photoelectric cell $111_a$ is increased and the amount of sunlight received by the photoelectric cell $111_b$ is decreased. This serves to move the mirror assembly 111 until the outputs $O_a$ and $O_b$ from the photoelectric cells $111_a$ and $111_b$ become equal and stop the movement of the mirror unit 11 so that the mirrors 76 in the tracking mirror assembly 65 are in a position directly facing the sun. Thus, as the sun moves with respect to the system, the control circuit 110 continues to shift the mirror unit 11 around the support rail 21 to keep the mirrors 76 directly facing the sun.

To control the tilt of the flat mirrors 76 in the tracking mirror assembly 65 about their axes $A_L$, a vertical sun tracking control unit 120 as seen in FIG. 10 is used to control the operation of the drive motor 121 in the eccentric drive 80 shown in FIG. 8. The vertical sun tracking control circuit 120 controls the rotation of the flat mirror 76 about their pivot axes $A_L$ until the sunlight received on the mirrors 76 is directed horizontally across to the concentrator mirror assembly 66. The drive motor 121 in the eccentric drive 80 is also reversible so that it can be rotated in either direction.

The vertical sun tracking control circuit 120 includes a pair of collimated photoelectric cells 122 pivotally mounted on one side of the support frame 74 of the tracking mirror assembly 65 as best seen in FIGS. 1 and 2. The photoelectric cells 122 are mounted at opposite ends of a support bar 124 pivoted at its midpoint about a horizontal pivot axis $A_P$. The photoelectric cells 122 are oriented on opposite ends of support member 124 so that they are parallel and face the same direction. The support member 124 is provided with a drive link 125 connected to the eccentric drive 80 as shown by dashed line in FIG. 8 so that, as the flat mirrors 76 are pivoted about their axes $A_L$, the support member and thus the photoelectric cells 122 will be pivoted about the axis $A_P$.

The photoelectric cells 122 are oriented parallel to a central axis $A_X$ extending through the pivot axis $A_P$ so that, when the central axis $A_X$ directly faces the sun with the angle of inclination of axis $A_X$ equal to the angle of inclination of the sun, the amount of sunlight received by each of the photoelectric cells 122 will be equal. As the angle of inclination of the sun changes so that the central axis $A_X$ does not directly face the sun, however, the sun will shine more directly into one of the photoelectric cells 122 than in the other so that the values of the outputs therefrom will differ from each other. This difference in output of the photoelectric cells 122 is used to control the drive motor 121 to tilt the mirrors 76 about the axes $A_L$ until the sunlight is reflected horizontally across to the concentrator mirror assembly 66.

The linkage connecting the support member 124 with the eccentric drive 80 is such that a predetermined relationship is maintained between the tilt angle of the pivoted mirror 76 and the tilt angle of the central axis $A_X$ so that, when central axis $A_X$ is oriented directly toward the sun, the mirrors 76 will be tilted to an appropriate angle to reflect the sunlight across to the concentrator mirror assembly 60 horizontally. It will be noted that this linkage is such that the axis $A_X$ will be pivoted through twice the angle through which the mirrors 76 are pivoted each time they are moved so as to maintain this predetermined relationship. The control circuit 120 serves to keep the central axis $A_X$ directly facing the sun as the angle of inclination of the sun changes so that the sunlight will be reflected horizontally across to the concentrator mirror assembly 66 by the mirrors 76 in the tracking mirror assembly 65.

Referring to FIG. 10, the photoelectric cells in the vertical sun tracking control circuit 120 have been individually referenced $122_U$ and $122_L$ with their outputs respectfully referenced $O_U$ and $O_L$. Outputs $O_U$ and $O_L$ are connected to a pair of comparators $CP_3$ and $CP_4$ so that, when output $O_U$ is greater than the output $O_L$, comparator $CP_3$ will generate an output and when output $O_L$ is greater than output $O_U$, comparator $CP_4$ will generate an output. The output of comparator $CP_3$ is connected to the coil of control relay 3CR while the output of comparator $CP_4$ is connected to the coil of control relay 4CR. Control relays 3CR and 4CR serve to control the direction of rotation of the eccentric drive motor 121 to selectively pivot the mirrors 76 in the tracking mirror assembly 65 about their axes $A_L$.

One side of the eccentric drive motor 121 is connected to wire 126 while the opposite side of motor 121 is connected to wire 128. The normally open contacts $3CR_1$ of relay 3CR connect the wire 126 with the common positive power wire 116 while the normally open contacts $3CR_2$ connect wire 128 with the common ground power wire 118. Thus, when relay 3CR is energized, contacts $3CR_1$ connect wire 116 to wire 126 and contacts $3CR_2$ connect wire 118 to wire 128 to drive the eccentric drive motor 121 in one rotational direction. The normally open contacts $4CR_1$ of relay 4CR connect wire 126 with the common ground power wire 118 while the normally open contacts 4CR$_2$ connect wire 128 with common positive power wire 116. Thus, when relay 4CR is energized, contacts 4CR$_1$ connect wire 118 with wire 126 and contacts 4CR$_2$ connect wire 116 with wire 128 to drive the eccentric drive motor 121 in the opposite rotational direction.

As seen in FIG. 8, the output $O_U$ of photoelectric cell 122$_U$ will be greater than the output $O_L$ of photoelectric cell 122$_L$ when the angle of inclination of the sun is greater than the angle of inclination of the axis $A_X$ associated with cells 122 and relay 3CR will be energized. On the other hand, the output $O_L$ of photoelectric cell 122$_L$ will be greater than the output $O_U$ of photoelectric cell 122$_U$ when the angle of inclination of the sun is less than the angle of inclination of the axis $A_X$ and relay 4CR will be energized. The rotational direction of motor 121 when relay 3CR is energized is selected to tilt the mirrors 76 upwardly as seen in FIG. 8 so that the photoelectric cells 122 are moved in a direction where the amount of sunlight received by the photoelectric cell 122$_L$ increases and the amount of sunlight received by the photoelectric cell 122$_U$ decreases. The rotational direction of motor 121 when relay 4CR is energized is selected to tilt mirrors 76 downwardly as seen in FIG. 8 so that the photoelectric cells 122 are moved in a direction where the amount of sunlight received by the photoelectric cell 122$_U$ increases and the amount of sunlight received by photoelectric cell 122$_L$ decreases. This serves to tilt the mirrors 76 and photoelectric cells 122 until the outputs $O_U$ and $O_L$ from photoelectric cells 122$_U$ and 122$_L$ become equal and stop the mirrors 76 so that the sunlight is reflected therefrom horizontally across to the concentrator mirror assembly 66. Thus, as the angle of inclination of the sun changes, the control circuit 120 continues to tilt mirrors 76 to keep the sunlight reflected horizontally across to the concentrator mirror assembly 66.

Figure 11:
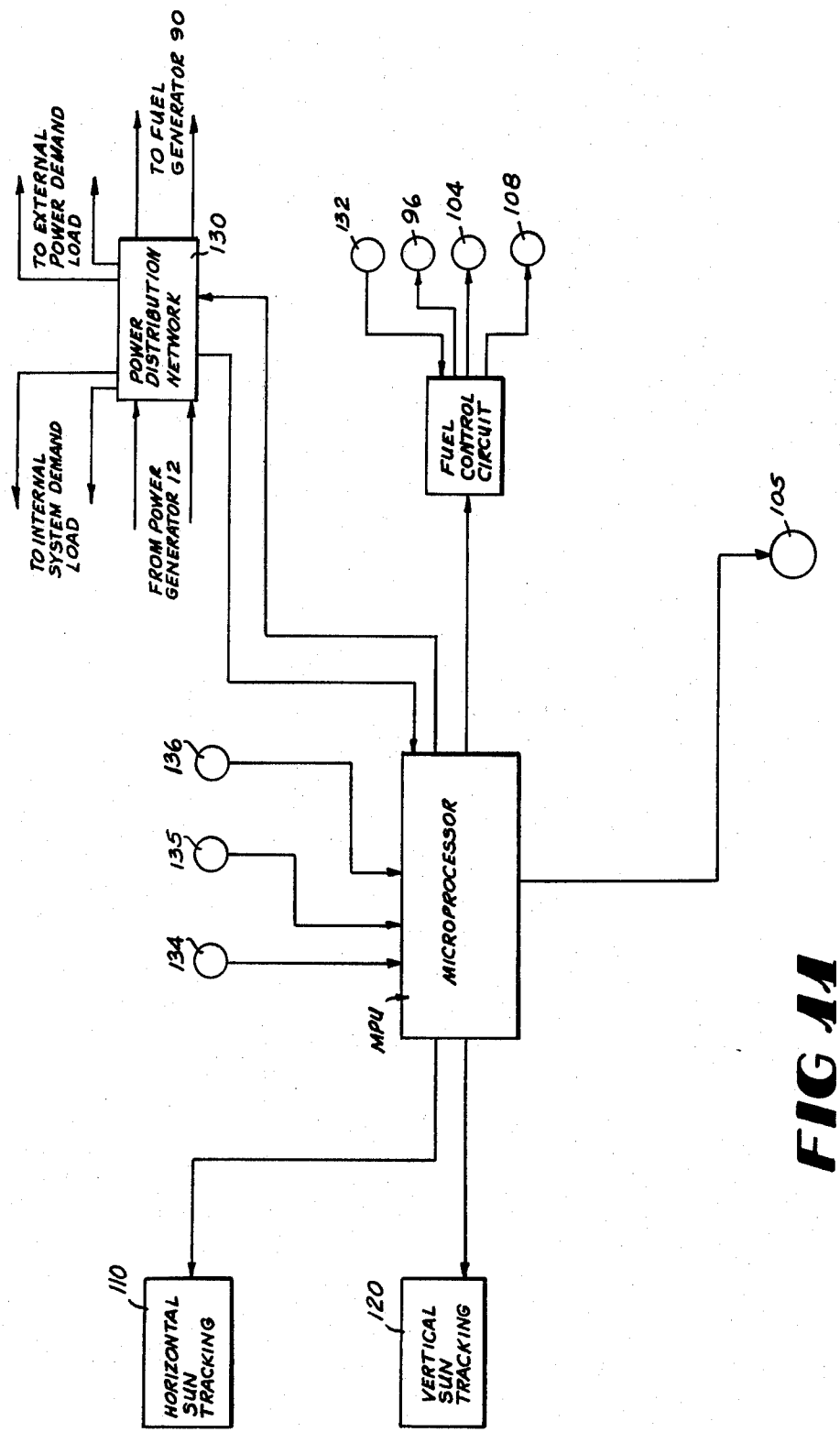
FIG. 11 is a schematic view illustrating overall control of the system.

As seen in FIG. 11, the output from the electrical power generator unit 12 is connected to a power distribution network 130 which selectively connects the output of unit 12 to the external power demand load, the internal system demand load and the fuel generator 90. The distribution network 130 has a built-in inverter so that direct current can be supplied to the fuel generator 90 and alternating current can be supplied to the external power demand load. The network 130 monitors the output of the generator unit 12 and the external power demand load. When the output of generator unit 12 exceeds the external power demand load and the internal system demand load, the network 130 supplies enough of the output of generator unit 12 to satisfy these demand loads and routes the remaining output to the fuel generator 90 to generate hydrogen for storage.

The fuel generator 90 is controlled by a fuel control circuit 131 connected to water level sensor 132 in the chamber 94 of housing 92$_H$ seen in FIG. 5, the water inlet valve 96, and the pumps 104 and 108. As power is supplied to the fuel generator 90 from the power distribution network 130, oxygen and hydrogen gas will evolve and the water level in chambers 94 in housing 92 will be lowered. When the water level has been lowered a prescribed amount, the water level sensor 132 will be tripped. This causes the control circuit 131 to open the water inlet valve 96 to raise the water level in chambers 94 while at the same time causing pump 104 to pump the generated hydrogen gas in housing 92$_H$ to the storage tanks 91 through the distribution valve assembly 105 and pump 108 to pump the generated oxygen out of housing 92$_O$. When the water level has been raised back to the desired level, sensor 132 is operated to cause control circuit 131 to close inlet valve 96 and stop pumps 104 and 108 and the operation repeats itself.

The overall operation of the system is controlled from a microprocessor MPU connected to the power distribution network 130, the fuel control circuit 131, the distribution valve assembly 105, the horizontal sun tracking control circuit 110 and the vertical sun tracking control circuit 120. The microprocessor MPU is also connected to a sunlight monitor 134, a wind monitor 135, and a fuel level monitor 136. The sunlight monitor 134 detects the level of solar isolation available. The microprocessor is programmed so that when the solar isolation detected by sunlight monitor 134 is below a predetermined threshold level judged to be insufficient to provide any significant heating of the air in column unit 10, the microprocessor MPU will disable the sun tracking control circuits 110 and 120 to prevent operation of motors 72 and 121 to stop the mirror assemblies 65 and 66 from being moved to track the sun. If the fuel level monitor 136 indicates hydrogen is available from storage tanks 91, then the microprocessor MPU operates the distribution valve assembly 105 so that the hydrogen from tanks 91 is supplied to burner assembly 56 for burning in air passage 31 to heat the air and operate power generator unit 12. The microprocessor MPU monitors the output of the generator unit 12, the internal system demand load and the external power demand load and controls distribution valve assembly 105 so that just enough hydrogen is supplied to burner assembly 56 to operate the generator unit 12 so that its output equals the internal system demand load and the external power demand load. If the fuel level monitor 136 indicates that no hydrogen is available in storage tanks 91, then the microprocessor MPU operates the distribution valve assembly 105 to supply fuel from the external fuel source to the burner assembly 56 for burning in air passage 31 and operate the generator unit 12 so that its output equals the internal system demand load and the external power demand load.

When the solar isolation detected by sunlight monitor 134 is above the threshold level but insufficient to operate the generator unit 12 at a level which satisfies the internal system demand load and the external power demand load, the microprocessor MPU enables the sun tracking control circuits 110 and 120 to operate motors 72 and 121 and cause mirror assembly 65 to track the sun. The sunlight is thus reflected onto mirror assembly 66 and thence onto the centerbody assembly 25 to heat it. This serves to heat the air in column unit 10 to operate the generator unit 12 but at a level where its output does not satisfy the internal system demand load and the external power demand load. To supplement the solar heating of the air in column unit 10, the microprocessor MPU also operates the distribution valve assembly 105 to supply hydrogen, if available from tanks 91, or fuel from the external fuel source to the burner assembly 56 for burning. The amount of fuel supplied to burner assembly 56 is just sufficient to additionally heat the air in column unit 10 so as to operate the generator unit 12 at a level where its output equals the internal system demand load and the external power demand load.

As soon as the level of solar isolation detected by sunlight monitor 134 is sufficient to operate the generator unit 12 at a level which at least satisfies the internal system demand load and the external system demand load, the microprocessor MPU operates the distribution valve assembly 105 to connect the outlet pipe 102 from the fuel generator 90 to the storage tanks 91 and cut off the fuel supplied to burner assembly 56. The fuel control circuit 131 is enabled so that hydrogen will be generated and stored using the excess output of the power generator unit 12.

The wind monitor 135 detects the velocity and direction of the wind. When the wind velocity exceeds a predetermined level at which the mirror assemblies 65 and 66 may be damaged, the microprocessor MPU causes the power distribution network 130 to disconnect power from the fuel generator 90 and disable the fuel control circuit 131. The distribution valve assembly 105 is transferred to supply fuel to the burner assembly 56 from storage tanks 91 or the external fuel supply so that the air in column unit 10 is heated thereby. At the same time, the microprocessor MPU overrides the outputs from the photoelectric cells 111 in the horizontal sun tracking control circuit 110 and operates the drive motors 72 to move the mirror unit 11 until the back of the concentrator mirror assembly 66 faces into the wind. This positions the mirrors 82 in the mirror assembly 66 so that the wind can pivot the mirrors 82 about their axes $A_L$ against springs 84 to the dashed line positions seen in FIG. 9 to minimize the wind resistance thereof. Also, the microprocessor MPU overrides the outputs of the photoelectric cells 122 in the vertical sun tracking control circuit 120 and operates the eccentric drive motor 121 to pivot the mirrors 76 about their axes $A_L$ until mirrors 76 are substantially horizontal as shown by dashed lines in FIG. 8 to minimize the wind resistance thereof. This action, of course, minimizes the likelihood of wind damage to the mirrors 76 in tracking mirror assembly 65 and the mirrors 82 in the concentrator mirror assembly 66. When the wind velocity drops below the predetermined level, the microprocessor MPU returns the system to its original state.

What is claimed as invention is:

1. A power generating system for supplying electrical power to an external electrical power demand load comprising:

an elongate vertically oriented centerbody adapted to absorb radiant solar energy therein to be heated;

an annular enclosure around said centerbody defining a vertically extending air passage within said enclosure around said centerbody open to the atmosphere at its upper end, said annular enclosure including transmission sections therein around said centerbody capable of transmitting radiant solar energy therethrough toward said centerbody;

mirror means for directing solar radiant energy through said transmission sections in said enclosure across said air passage and onto said centerbody to heat said centerbody so that the air in said air passage is heated by said centerbody to rise out of the upper end of said passage;

air inlet means defining an inlet passage therein in communication with the lower end of said air passage for directing atmospheric air into the lower end of said air passage so that the pressure differential generated within said air passage as the air is heated by said centerbody induces an air flow through said inlet passage and along said air passage from the lower end to the upper end thereof;

rotor means rotatably mounted in said inlet means and including a plurality of vanes operatively associated with the air passing through said air inlet means so that the air flowing through said air inlet means causes said rotor means to rotate; and electrical power generating means operatively connected to said rotor means so that rotation of said rotor means causes said generating means to generate electrical power for the external electrical power demand load.

2. The power generating system of claim 1 wherein said air inlet means defines an inlet passage therethrough having an intake end open to the atmosphere and an outlet end communicating with the lower end of said air passage around said centerbody; and wherein said rotor means includes a first set of vanes located at the intake end of said inlet passage and a second set of vanes located at the outlet end of said inlet passage, said inlet passage arranged so that the air passing through said inlet passage first contacts said first set of vanes to rotate said rotor means in a given direction and is redirected so that the air subsequently contacts said second set of vanes to further rotate said rotor means in said given direction.

3. The power generating system of claim 1 wherein said mirror means includes a first mirror assembly, a second mirror assembly and mounting means mounting said first and second mirror assemblies in operative association with each other so that said first mirror assembly reflects sunlight onto said second mirror assembly and said second mirror assembly concentrates and reflects the sunlight reflected thereon by said first mirror assembly through said transmission sections on said enclosure and onto said centerbody to heat same.

4. The power generating system of claim 3 wherein said mirror means further includes tracking control means for maintaining said first mirror means aligned with the sun to maximize the amount of sunlight reflected onto said second mirror means by said first mirror means.

5. The power generating system of claim 1 further including electrically operated hydrogen gas generating means; gas storage means; fuel distribution means; burner means in said air passage around said centerbody; and fuel control means, said fuel control means selectively connecting said gas generating means to the electrical output of said electrical power generating means to cause said hydrogen gas generating means to generate hydrogen gas by electrolysis and said fuel distribution means to transfer the hydrogen gas from said gas generating means to said gas storage means and selectively causing said fuel distribution means to supply hydrogen gas from said fuel storage means to said burner means for burning the hydrogen gas in said air passage around said centerbody to heat the air therein and induce an air flow through said inlet passage and said air passage to rotate said rotor means.

6. The power generating system of claim 3 wherein said mounting means movably mounts said first and second mirror assemblies for movement around said annular enclosure about a circular path concentric of said enclosure with said first mirror assembly and said second mirror assembly maintained on diametrically opposed sides of said enclosure, and further including first drive means for selectively moving said first and second mirror assemblies around said circular path, first sensing means for determining the direction of the sun with respect to said first mirror assembly, and first tracking control means operatively connected to said first drive means and said first sensing means to cause said first drive means to move said first and second mirror assemblies around said circular path to maintain said first mirror assembly directly facing the sun to reflect the sunlight onto said second mirror assembly.

7. The power generating system of claim 6 wherein said first mirror assembly includes a plurality of flat mirrors pivoted about horizontally oriented parallel axes and further including second drive means for simultaneously pivoting said flat mirrors about said horizontal axes so that said flat mirrors have equal angles of inclination as they are pivoted, second sensing means for determining the angle of inclination of the sun and second tracking control means operatively connected to said second drive means and said second sensing means to pivot said flat mirrors about said horizontal axes to maintain the angle of inclination of said flat mirrors such that the sunlight imposed on said flat mirrors is reflected horizontally to said second mirror assembly.

8. The power generating system of claim 4 further including monitoring means for monitoring the electrical power output from said electrical power generating means and the external electrical power demand load, said monitoring means connected to said fuel control means to cause said fuel control means to connect said gas generating means to the electrical output of said electrical power generating means and to cause said fuel distribution means to transfer the hydrogen gas from said gas generating means to said gas storage means when the electrical power output from said electrical power generating means exceeds the external power demand load; and to cause said fuel control means to disconnect said gas generating means from the electrical power output of said electrical power generating means and to cause said fuel distribution to supply hydrogen gas from said fuel storage means to said burner means when the external power demand load exceeds the electrical power output of said electrical power generating means.

* * * * *